(12) United States Patent
Michalik et al.

(10) Patent No.: US 12,291,114 B2
(45) Date of Patent: May 6, 2025

(54) ELECTRIC VEHICLE CHARGING PLUG

(71) Applicant: ABB Schweiz AG, Baden (CH)

(72) Inventors: Adam Michalik, Bibice (PL); Renata Porębska, Oświęcim (PL); Artur Zawadzki, Cracow (PL); Marcin Białas, Cracow (PL); Wojciech Wysocki, Cracow (PL); Dariusz Bednarowski, Cracow (PL)

(73) Assignee: ABB E-mobility B.V., Delft (NL)

( * ) Notice: Subject to any disclaimer, the term of this patent is extended or adjusted under 35 U.S.C. 154(b) by 356 days.

(21) Appl. No.: 17/856,387

(22) Filed: Jul. 1, 2022

(65) Prior Publication Data

US 2023/0001808 A1    Jan. 5, 2023

(30) Foreign Application Priority Data

Jul. 5, 2021  (EP) ..................... 21183673

(51) Int. Cl.
*B60L 53/16* (2019.01)
*H01R 13/66* (2006.01)
*H04W 4/80* (2018.01)

(52) U.S. Cl.
CPC .......... *B60L 53/16* (2019.02); *H01R 13/6683* (2013.01); *H04W 4/80* (2018.02); *H01R 2201/26* (2013.01)

(58) Field of Classification Search
CPC ...... B60L 53/16; H04W 4/80; H01R 13/6683; H01R 2201/26

USPC ....................................................... 439/620.1
See application file for complete search history.

(56) References Cited

U.S. PATENT DOCUMENTS

| | | | |
|---|---|---|---|
| 2010/0295694 | A1 | 11/2010 | Kauffman et al. |
| 2018/0060615 | A1* | 3/2018 | Ashwood-Smith ......... G06K 19/0716 |
| 2019/0126764 | A1 | 5/2019 | Führer |
| 2021/0086630 | A1 | 3/2021 | Sturza et al. |

FOREIGN PATENT DOCUMENTS

| | | | |
|---|---|---|---|
| DE | 102012222462 A1 | 6/2014 | |
| DE | 102018120057 A1 | 2/2019 | |
| EP | 2829432 A2 | 1/2015 | |
| EP | 2829432 A3 | 4/2015 | |
| KR | 10-2017-0093269 A | 8/2017 | |
| WO | WO 2018/105809 A1 | 6/2018 | |
| WO | WO 2018/192805 A1 | 10/2018 | |
| WO | WO-2020174267 A1 * | 9/2020 | ............... B60L 3/04 |

* cited by examiner

*Primary Examiner* — Gary F Paumen
(74) *Attorney, Agent, or Firm* — Leydig, Voit & Mayer, Ltd.

(57) ABSTRACT

An electric vehicle charging plug includes a housing for connecting to an electric vehicle, a main housing, a sensor comprising at least one conductive path embedded in a wall or arranged on the surface of the housing and/or main housing, and a control unit wherein the sensor is configured to detect the crack of the housing and/or the main housing.

Figure 1A:
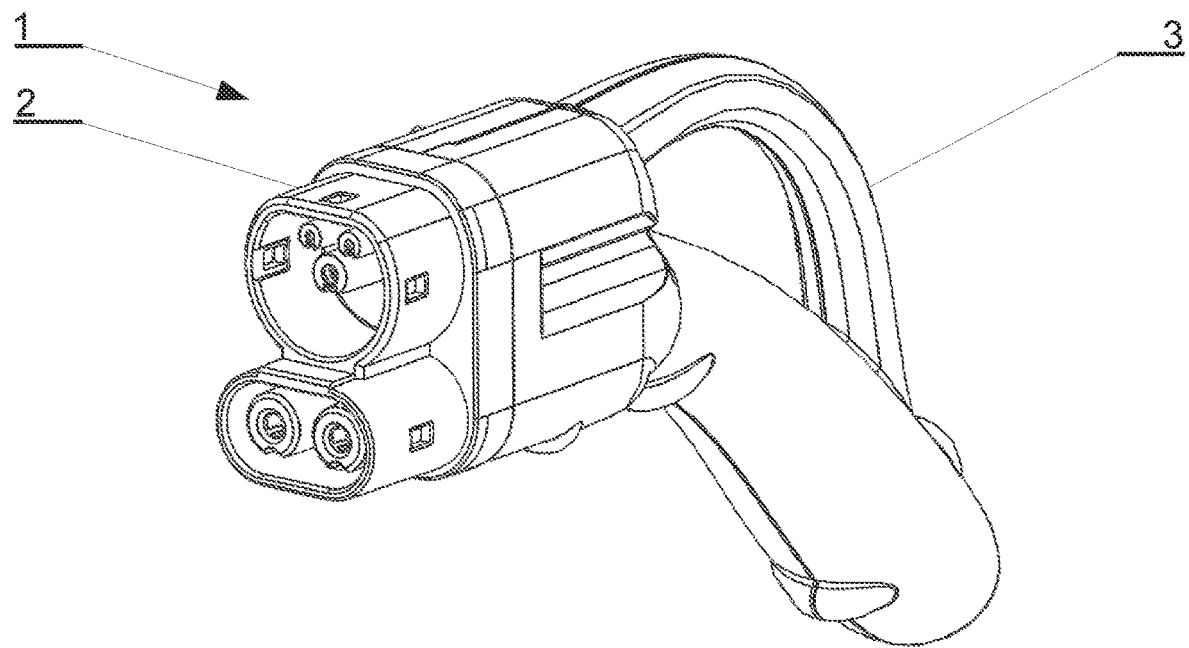

12 Claims, 5 Drawing Sheets

ELECTRIC VEHICLE CHARGING PLUG

CROSS-REFERENCE TO RELATED APPLICATIONS

This patent application claims priority to European Patent Application No. 21183673.9, filed on Jul. 5, 2021, which is incorporated herein in its entirety by reference.

FIELD OF THE DISCLOSURE

The present disclosure invention relates to an electric vehicle charging plug and a charger comprising such charging plug.

BACKGROUND OF THE INVENTION

One of the most common failures of an electric vehicle charging plug is cracking of its housing.

It usually happens due to mechanical shock, for example due to dropping a plug by a user or running
 a wheel of a car over a plug lying on the ground. A mechanical damage of a plug might have different degrees starting from microcracks and ending on a substantial destruction of the plug housing. In all cases, the destruction of the integrity of the plug entails the appearance of a security risk to the user. In particular, small cracks that can cause loss of electrical insulation of the device, which are so small that they may go unnoticed by the user, can be very dangerous. Such a defect may cause a significant risk of electric shock to the user.

From Korean patent application KR20170093269 there is known a power plug for charging an electric vehicle comprising a plug portion including a plurality of circular plug pins configured to be inserted into a power outlet and a sensor disposed adjacent to the plug portion arranged to sense heat of the plug portion. Furthermore, the power plug comprises a housing for gripping the plug portion and supporting the sensor therein and a cable having one end thereof inserted into the housing and having a wire inside connected to the plug portion and a portion of the outer circumferential surface thereof fixed to the housing. The Korean application raises the problem of preventing electric shock and fire by using the temperature sensor arranged to detect threshold values associated with currents causing possible damage of the plug. KR20170093269 is silent about detecting cracks in the housing of the plug.

From PCT patent application WO2018192805 there is known a charging connector for a motor vehicle comprising a connection module and a load contact module. The connection module is arranged to be connected to supply lines for supplying power. The load contact module includes a load contact for transmitting a charging power. The load contact module is arranged to be removably and replaceably secured to the connection module. Further the load contact module includes a temperature sensor. Likewise the abovementioned Korean application WO2018192805 focuses on the overheating problem occurring in EV charging plugs.

WO2018105809A1 discloses a portable charger for an electric car comprising a plug arranged to be connected to a power source and a control box connected to the plug. Further the plug comprises a bipolar plug pin, a neutral pole plug pin, a first temperature sensor installed adjacent to the positive electrode plug pin and a second temperature sensor disposed adjacent to the neutral pole plug pin. The control box is configured to receive signals from the first temperature sensor and the second temperature sensor and based on a calculated difference in those signal values decrease or stop transmission of current from the power source to the electric car. The PCT disclosure aims in improving continuity of charging by eliminating a problem of false signals deriving from using only one temperature sensor. It also solves a possible plug overheating problem and controlling current values transmitted to the car.

DE102018120057 discloses a temperature measuring instrument having a panel-shaped cover element made of a ceramic material i.e. alumina-ceramic substrate, or plastic, a carrier element and a temperature measuring unit comprising conductive strips. The carrier element is a glass-fiber reinforced printed circuit board. Further, the conductive strips may be arranged on the carrier element or between the carrier element and the cover element. The carrier and cover elements are operatively connected with each other such that a connection of the carrier and cover elements is carried out through a glass solder. The carrier element is provided with recesses that are formed for retaining plug-in units within a region of a plug connector, wherein a material thickness of the carrier element amounts to 0.15-5 mm. Copper spring-loaded contacts are positioned within a region of the recesses. The German application aims at providing a temperature measuring instrument for plug connectors which is simple in construction and enables temperature measurement on site, i.e. in the area of the plug connector/mating connector parts connected to one another, precisely. As a result it solves the problem of overheating of a charger during a charging process.

US2019126764A1 discloses an electric vehicle charging plug comprising a housing for accommodating power contacts, power contacts for power transmission, a cooling system and an apparatus for detecting liquid leaking from the cooling system and collecting inside the housing. The apparatus for detecting a liquid has at least one detector element having a conductor track structure. The detector element is arranged in an interior of the housing and the conductor track structure forms a detection face for detecting the liquid. The US application raises the problem of a charging plug damage caused by leaks from the cooling system resulting in possible injury of a charger operator. For this reason it proposes the apparatus for detecting a liquid leaking but it is silent about detecting cracks in the housing of the plug.

The solutions known in the prior art mainly focus on the problem of preventing the plug damage due to overheating of the plug. Neither of the aforementioned documents addresses the issue of lack of continuous monitoring of mechanical integrity status of a plug's housing, and a resulting increased risk of user electric shock and subsequent fire of the plug as well as reduction of its usage efficiency. Therefore, an object of the invention is to provide a charging plug solving these problems and having additional advantages disclosed in this application.

BRIEF SUMMARY OF THE INVENTION

The object of the invention is an electric vehicle charging plug comprising a housing for connecting to an electric vehicle, a main housing, a sensor comprising at least one conductive path embedded in a wall or arranged on the surface of the housing for connecting to an electric vehicle or the main housing, and a control unit, wherein the sensor is configured to detect the crack of the housing for connecting to an electric vehicle and/or the main housing.

The electric vehicle charging plug according to the invention ensures possibility of continuously monitoring of a mechanical integrity status of the plug's housing (herein understood as a housing connecting to an electric vehicle and/or a main housing) and thereby preventing its users from electric shock. It also allows for protecting the device from burning or other damages and leads to its more efficient usage as a result of reduction of the electric vehicle charging plug downtime due to its necessary service comparing to existing solutions.

Preferably, the control unit is configured to measure at least one of the characteristics of the least one conductive path and the sensor is configured such that upon at least partial breakage of the least one conductive path the at least one characteristic of the at least one conductive path measured by the control unit changes thereby indicating the crack of the housing and/or the main housing.

Preferably, the at least one conductive path is an electric conductive path and the control unit is configured to measure resistance, impedance, inductance and/or capacitance of the electric conductive path.

Preferably, the control unit is configured to measure resistance and the crack of the housing and/or the main housing is indicated by the increase of resistance.

Preferably, the sensor further comprises an RFID tag connected to an RFID tag's antenna, and an RFID controller connected to RFID controller's antenna configured to maintain a communication with the RFID tag, wherein the at least one conductive path acts as an RFID antenna or as an antenna of the RFID controller, and the sensor is configured such that upon at least partial breakage of the at least one conductive path the communication between the RFID controller and the RFID tag is no longer possible thereby indicating the crack of the housing and/or the main housing.

Preferably, the sensor further comprises an RFID system consisting of an RFID tag connected to an RFID tag's antenna, and an RFID controller connected to RFID controller's antenna. The RFID system is configured to measure at least one of the characteristics of the least one conductive path, wherein the sensor is configured such that upon at least partial breakage of the least one conductive path the at least one characteristic of the at least one conductive path measured by the RFID system changes thereby indicating the crack of the housing and/or the main housing.

Preferably, the at least one conductive path is a light conductive path and the control unit is configured to measure intensity, modulation and/or frequency of the light beam in the light conductive path.

Preferably, the at least one conductive path is made of metallic layer, conductive ink, conductive plastic, conductive elastomer.

Preferably, the at least one conductive path is in the form of conductive path on the foil.

Preferably, the at least one conductive path is arranged on the surface of the housing and/or the main housing by means of 3D printing or by means of the Laser Direct Structuring technology.

Preferably, the at least one conductive path is made from at least one conductive thread.

The application of at least one conductive thread allows for differentiation of deformation from at least partial breakage of the conductive path. Furthermore, said application provides an increase of the efficiency of the electric vehicle charging plug manufacturing process.

Preferably, the control unit is configured to communicate with a charging device.

Preferably, the control unit is configured to trigger a control signal of the charging device terminating or preventing the start of a charging process of the charging device upon detecting the crack of the housing and/or the main housing.

Preferably, the at least one conductive path is arranged on the inside or outside surface of the housing and/or the main housing.

Preferably, the sensor comprises at least two conductive paths arranged in layers.

The invention also relates to an electric vehicle charger comprising the electric vehicle charging plug and the charging device.

BRIEF DESCRIPTION OF THE SEVERAL VIEWS OF THE DRAWING(S)

Figure 1B:
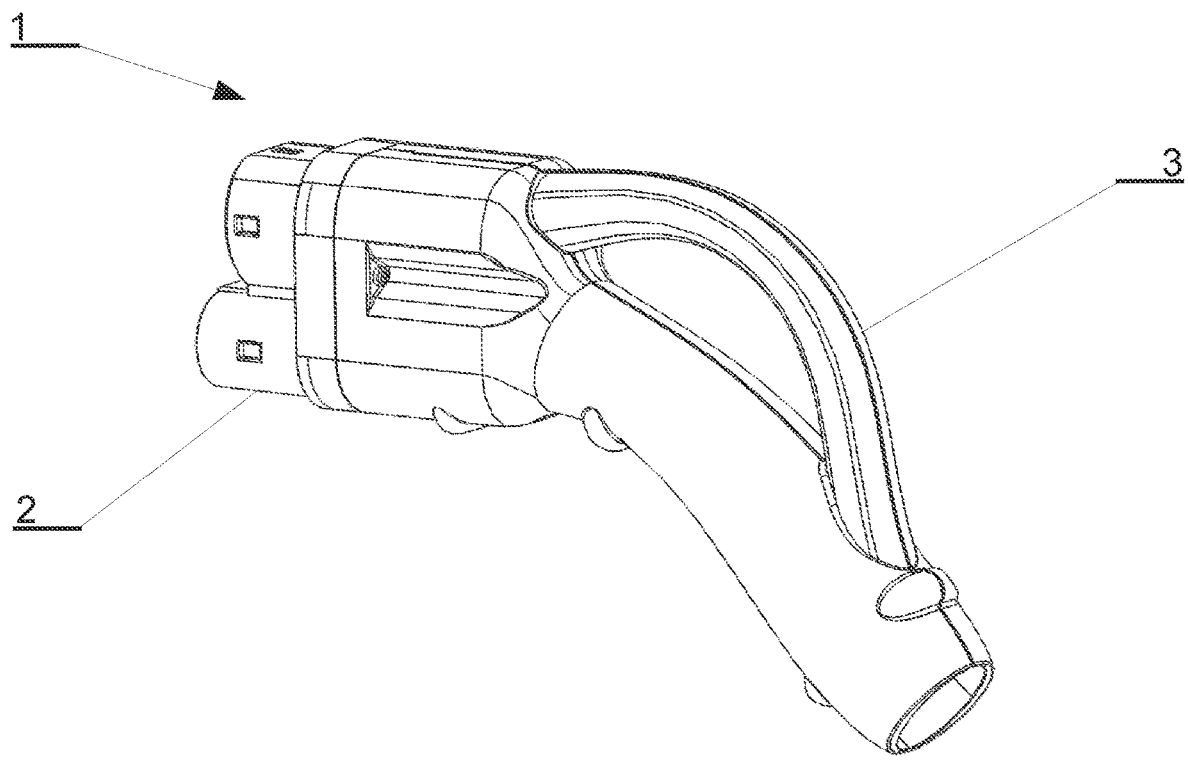
Figure 2:
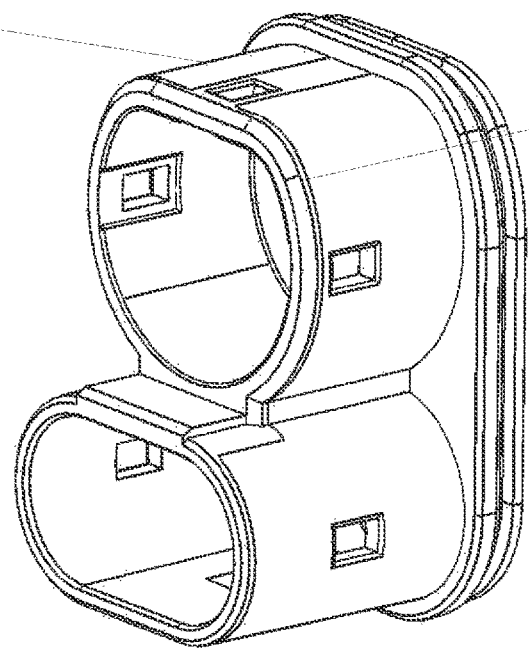
Figure 3:
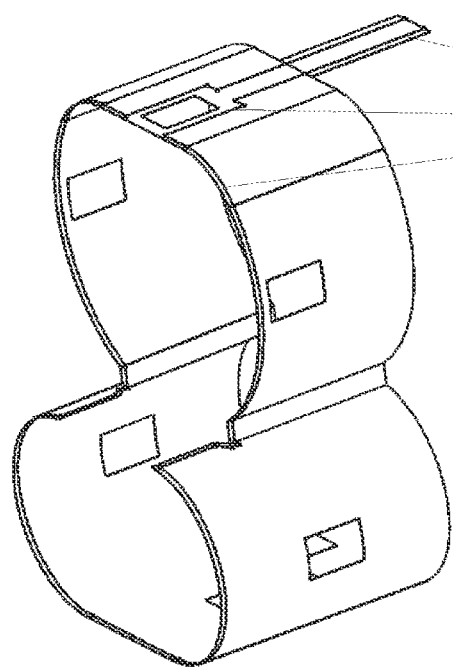
Figure 4:
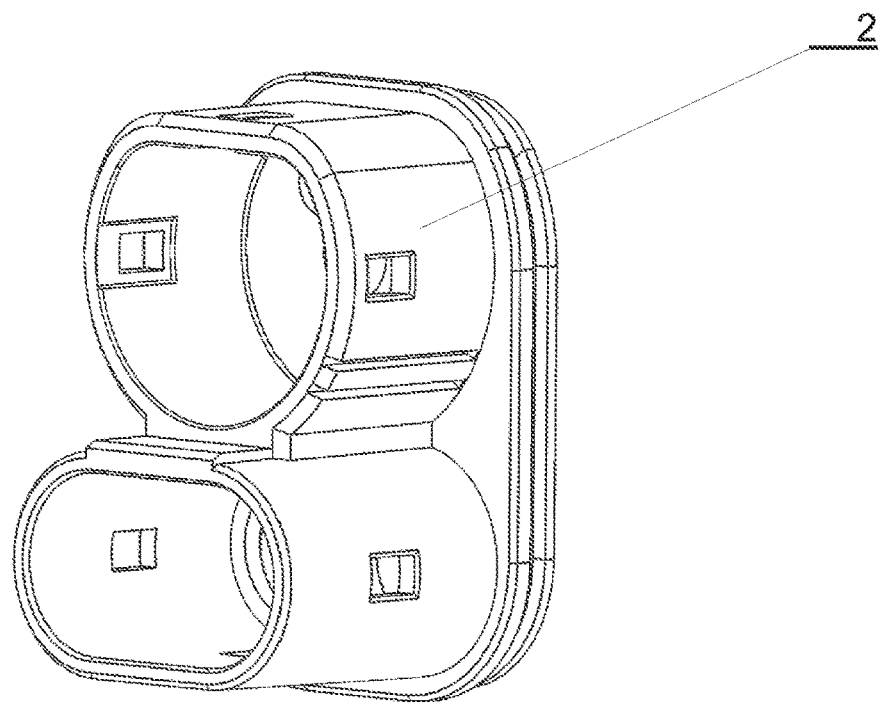
Figure 5:
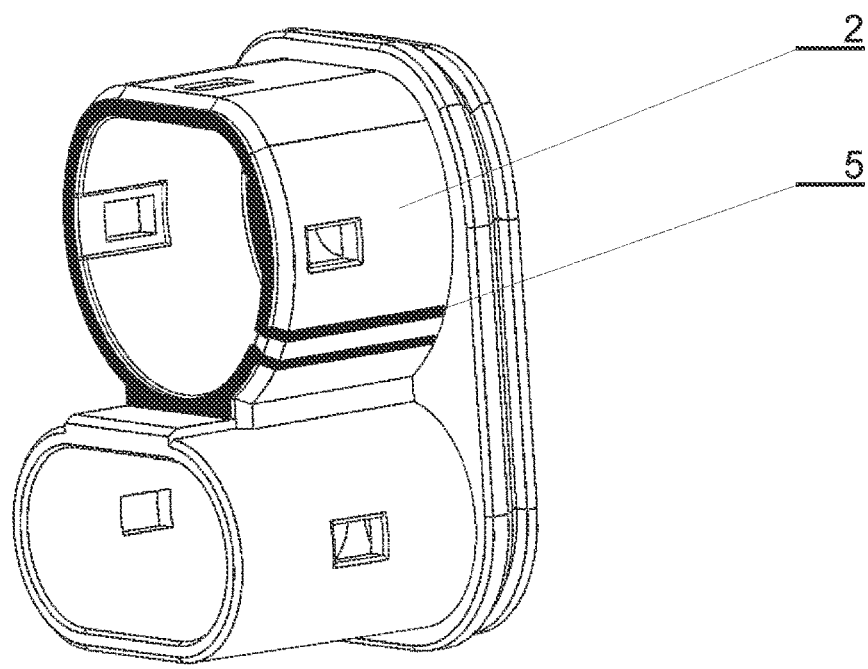
Figure 6:
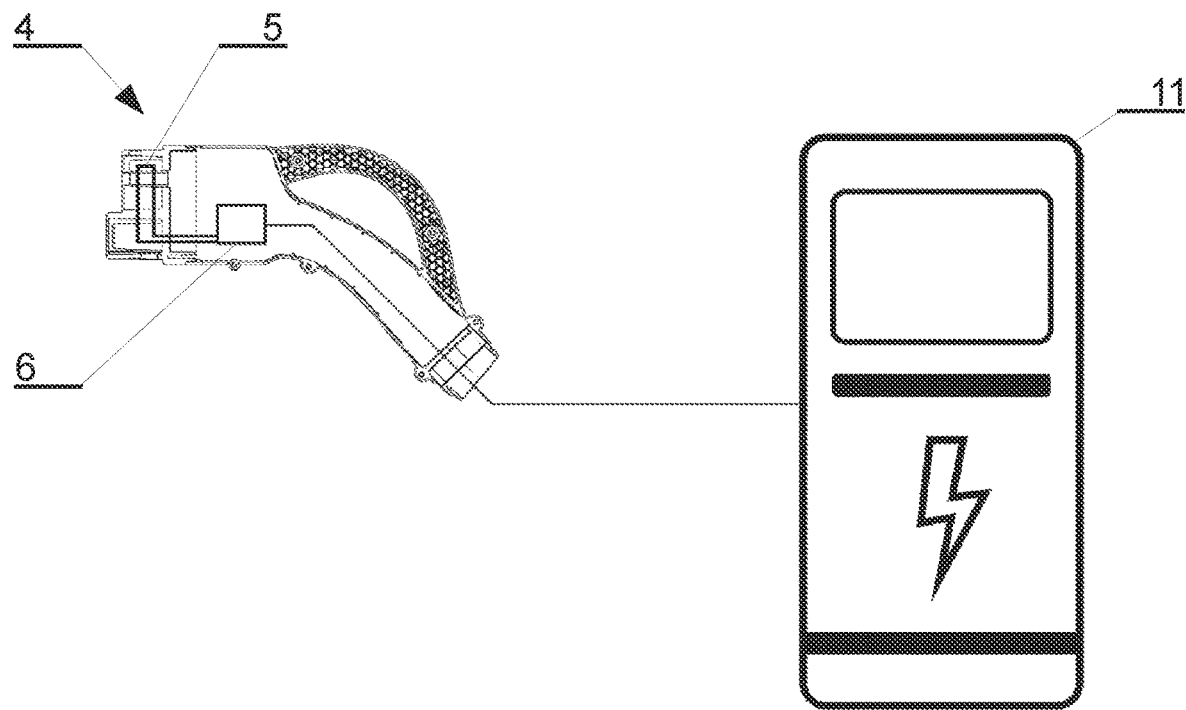
Figure 7:
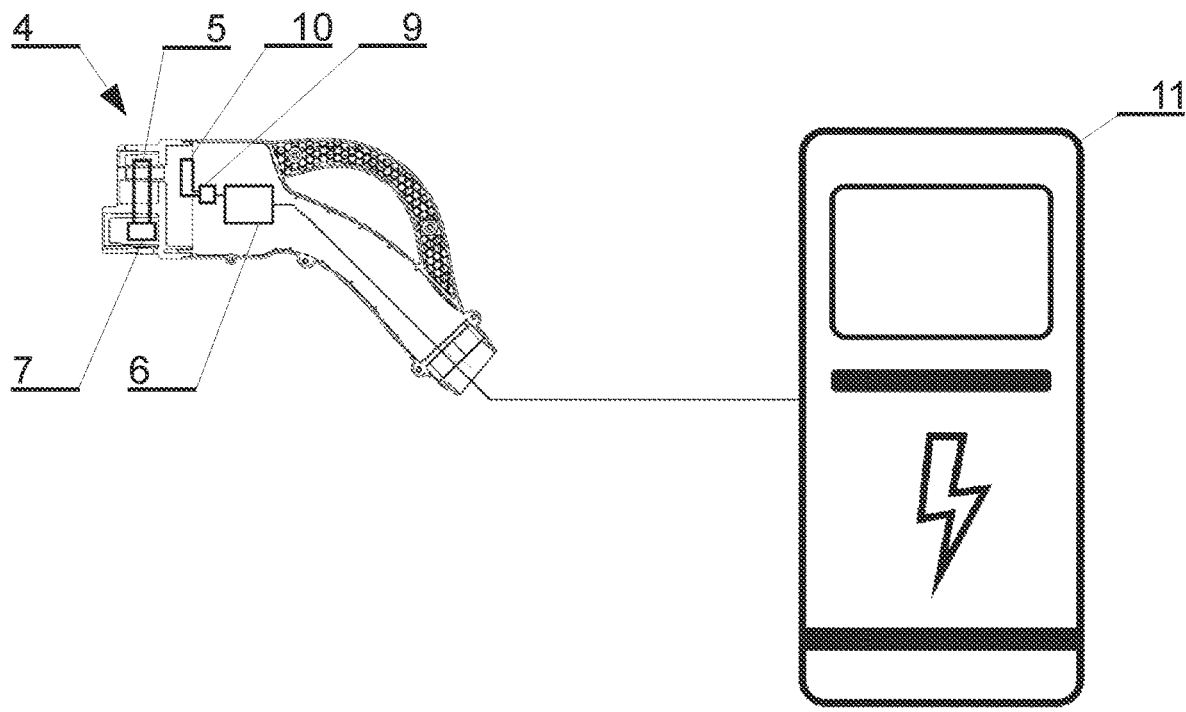
Figure 8:
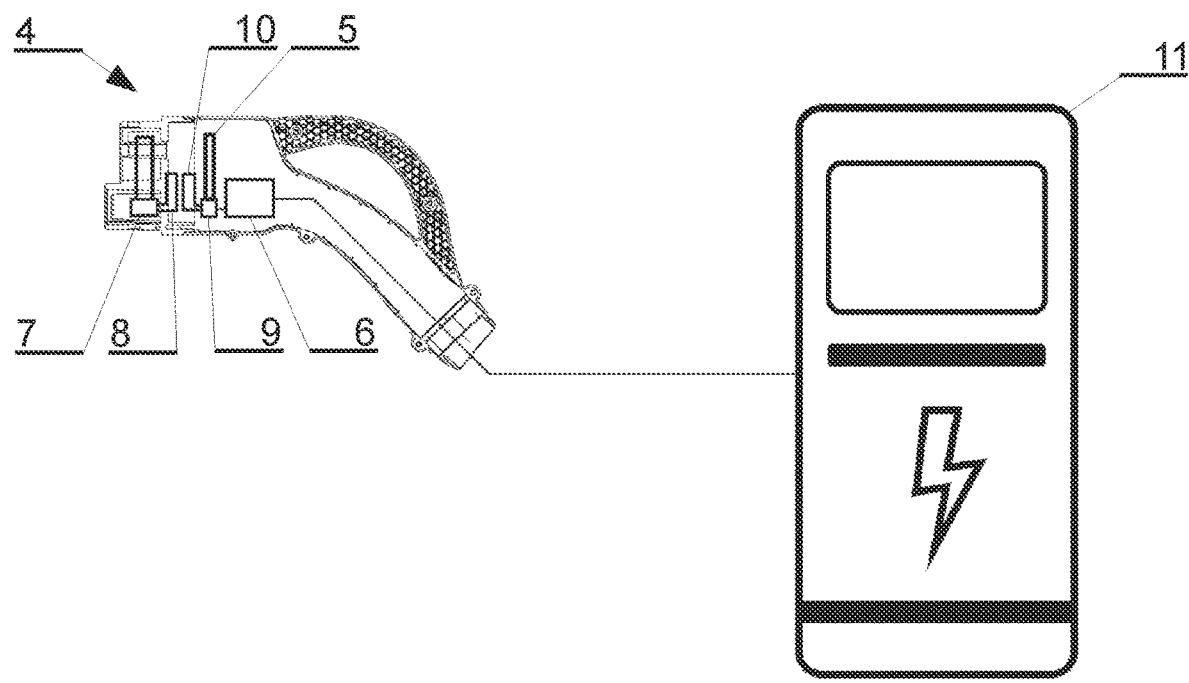
Figure 9:
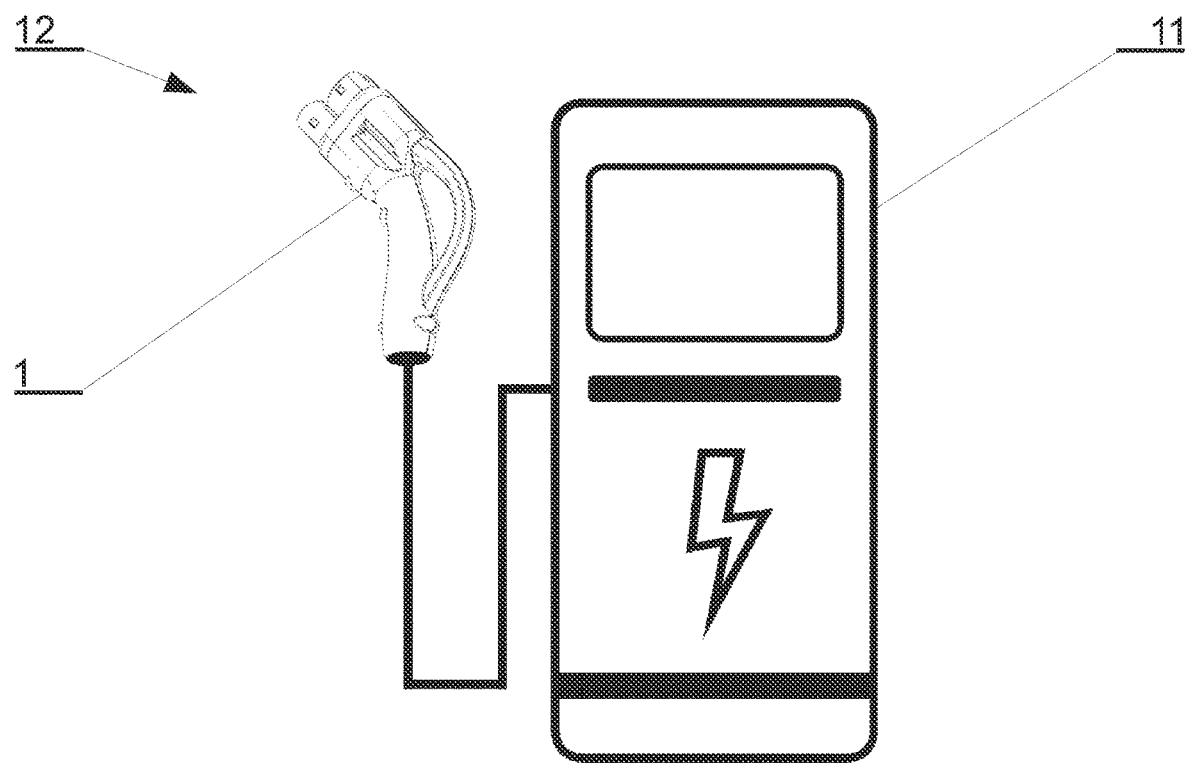

The subject of the invention is shown in the embodiments in a drawing, in which:

FIG. 1A presents an electric vehicle charging plug according to the invention in a frontal perspective view;

FIG. 1B presents an electric vehicle charging plug according to the invention in a rear perspective view;

FIG. 2 presents a housing for connecting to an electric vehicle of an electric vehicle charging plug according to the invention with conductive paths arranged on its outside surface in a perspective view;

FIG. 3 presents a shaped film structure for embedding in the housing for connecting to an electric vehicle comprising conductive path made of ink applied thereon;

FIG. 4 presents a housing for connecting to an electric vehicle with grooves in its outside surface for conductive paths in a perspective view;

FIG. 5 presents a housing for connecting to an electric vehicle with conductive paths embedded in its grooves in a perspective view;

FIG. 6 presents schematically a connection arrangement of an electric vehicle charging plug according to the first embodiment of the invention;

FIG. 7 presents schematically a connection arrangement of an electric vehicle charging plug according to the fifth embodiment of the invention;

FIG. 8 presents schematically a connection arrangement of an electric vehicle charging plug according to the sixth embodiment of the invention;

FIG. 9 presents the eight embodiment of the invention in a schematic view.

DETAILED DESCRIPTION OF THE INVENTION

The electric vehicle charging plug according to the invention allows for detecting cracks appearing on its housing for connecting to an electric vehicle and/or main housing thereby preventing its users from electric shock and subsequent fire.

The electric vehicle charging plug according to the invention ensures possibility of continuously monitoring of a mechanical integrity status of the plug's housing (herein understood as a housing for connecting to an electric vehicle and/or a main housing) and thereby preventing its users from electric shock. It also allows for protecting the device from burning or other damages and leads to its more efficient usage as a result of reduction of the electric vehicle charging plug downtime due to its necessary service comparing to existing solutions.

The detection of plug's breakage allows for a quick service of the plug which provides greater reliability of the charger and increases lifetime over the solutions known from the state of the art.

Monitoring of the plug's mechanical integrity allows to estimate the aging of the components inside the plug.

Detection of plug's breakage allows to send information about the damage of the plug to a charging device and thereby change an actual status of the charging device in the online software associated with the charging device and/or directly in the charging device as well.

Furthermore, the electric vehicle charging plug according to the invention eliminates the need for physical inspection of the plug and allows to plan the service of the plug or the charger in advance, especially when damage to the plug does not exclude the use of the charger.

The application of conductive threads provides by its flexibility improved differentiation of the conductive paths deformation from at least partial breakage.

Furthermore, the application of conductive threads provides an increase of the efficiency of the electric vehicle charging plug manufacturing process.

The application of a composite form comprising a layer of a foil, conductive paths and a plastic ensures protection for the conductive paths from adverse weather conditions.

The First Embodiment of the Invention

An electric vehicle charging plug 1 (FIG. 1A-B) comprising a housing 2 for connecting to an electric vehicle, a main housing 3 and a sensor 4 comprising electric conductive paths 5 arranged inside the surface of the housing 2 and the main housing 3, and a control unit 6.

The electric conductive paths 5 may have a form of conductive ink-applied on a flexible substrate such as e.g. a foil by ink-jet or screen printing method.

The foil can be a polycarbonate foil or PET foil. Alternatively, the electric conductive paths 5 can be etched from a metalized foil layer. The foil with the electric conductive paths 5 is placed in a molding tool in a way in which the electric conductive paths 5 are exposed directly to melted plastic injected in an injection molding process. Prior the over-molding, the electric conductive paths 5 are thermoformed in order to achieve a desired shape to fit to a socket of the molding tool (FIG. 3). Finally, the foil with the electric conductive paths 5 is over-molded with plastic to create a uniform composite with the over-molded plastic.

The foil can be positioned inside the molding tool either by an electrostatic charging of the foil (similarly to In Mold Labeling (IML) process) or by underpressure made by a creation of several small openings in a wall of the molding tool at areas at which the foil is going to be placed. The openings are connected with channels equipped with a vacuum pump.

The disclosed composite creation ensures protection for the electric conductive paths 5 from adverse weather conditions.

In the other embodiments of the invention, the electric conductive paths 5 can be placed inside the housing 2 and/or the main housing 3 by means of 2K injection molding process constituting over-molding of both sides of the electric conductive paths 5.

The control unit 6 is configured to measure resistance of the electric conductive paths 5 and the sensor 4 is configured such that upon at least partial breakage of the electric conductive paths 5 their resistance measured by the control unit 6 increases thereby indicating the crack of the housing 2 and/or the main housing 3. The increase in the resistance value corresponds to the number of broken electric conductive paths 5, which in turn allows the size of the cracks in the housing 2 and/or in the main housing 3 to be determined.

In the other embodiments of the invention, the control unit 6 is configured to measure impedance, inductance and/or capacitance of the electric conductive paths 5 and the sensor 4 is configured such that upon at least partial breakage of the least one conductive path 5 the impedance, inductance and/or capacitance of the at least one conductive path 5 measured by the control unit 6 changes thereby indicating the crack of the housing 2 and/or the main housing 3.

Furthermore, the control unit 6 is configured to communicate with a charging device 11, especially in such a way that it triggers a control signal of the charging device 11 terminating or preventing the start of a charging process of the charging device 11 upon detecting the crack of the housing 2.

In summary, the occurrence of cracks in the housing 2 and/or the main housing 3 is associated with breakages of the electric conductive paths 5. The breakages of the electric conductive paths 5 cause an increase in resistance in the monitored circuit, which in turn is detected by the control unit 6 which is in communication with the charging device 11. The control unit 6 can send a control signal to the charging device to terminate or to prevent the start of a charging process.

The application of the electric vehicle charging plug 1 with the sensor 4 comprising electric conductive paths 5 and the control unit 6 ensures possibility of continuously monitoring of the housing 2 and the main housing 3 mechanical integrality status and thereby preventing its users from electric shock and subsequent fire, and leading to its more efficient usage as a result of reduction of the electric vehicle charging plug 1 downtime due to its maintenance comparing to existing solutions. It is possible to a very quick detection of damage of the housing 2 and/or the main housing 3 as a result of a car wheel running over it.

The housing 2 and the main housing 3 can be made of one or more polymer materials, or polymer composite materials, including but not limited to acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyethylene, polypropylene, polyetherimide (PEI), polyphenylene sulfide (PPS), polyether ether ketone (PEEK), polyphthalamide (PPA), polyoxymethylene (POM), phenolformaldehyde (PF), unsatured polyester (UP), polyurethane (PUR and PU), polyimide, polyamide, polyvinyl alcohol, polyvinylidene chloride, polyacrylonitrile and polyalkylene paraoxybenzoate. In some embodiments, the composite can include a variety of types of fibers, including but not limited to carbon fiber, glass fiber, basalt fiber, wool, silk, cotton, rayon, cellulose, cellulose acetate, flax, ramie, jute and aramid fibers. In some embodiments, additives can be used to improve the qualities of the materials, including but not limited to the mechanical and thermal stability, chemical resistance, insulation property and flammability. The additives can include, but are not limited to, ceramics, alumina, calcium silicate, flame retardants and clays.

In other embodiments, electric conductive paths can be arranged inside the surface of the housing 2 or the main housing 3 only.

A second embodiment of the electric vehicle charging plug 1 is as in the first embodiment, with the difference that the electric conductive paths 5 are arranged on the outside surface of the housing 2 and the main housing 3 by means of 3D printing or by means of the Laser Direct Structuring technology. The electric conductive paths 5 can be arranged in layers next to each other. In still yet other embodiments, electric conductive paths are be arranged on the outside surface of the housing 2 or the main housing 3 only.

A third embodiment of the electric vehicle charging plug 1 is as in the first or the second embodiment, with the difference that the electric conductive paths 5 are made of conductive threads woven into a fabric and integrated with the housing 2 and the main housing 3 by covering them by injected plastic in an injection molding process or by gluing them to the housing 2 and the main housing 3. The fabric should be loose enough to allow plastic to penetrate the fabric.

The application of conductive threads provides by its flexibility improved differentiation of the conductive paths 5 deformation from at least partial breakage. Furthermore, the application of conductive threads provides an increase of the efficiency of the electric vehicle charging plug 1 manufacturing process.

A fourth embodiment of the electric vehicle charging plug 1 is as in the first embodiment, with the difference that the electric conductive paths 5 are in a form of electrically conductive plastic embedded in grooves of the housing 2 (shown in FIG. 5) and the main housing 3.

The electrically conductive plastics can be conductive thermoplastics or their blends, e.g. filled with conductive or semiconductive particles like metal, carbon black, graphite, graphene and/or metal oxides. Similarly, the electrically conductive plastics can be conductive elastomers or their blends, e.g. filled with conductive or semiconductive particles like metal, carbon black, graphite, graphene and/or metal oxides.

In the another, embodiment of the invention, the electric conductive paths 5 can be made of silver, copper, aluminum, or carbon in a solid form (e.g. in a form of a ribbon or a wire).

The Fifth Embodiment of the Invention

The fifth embodiment of the electric vehicle charging plug 1 as in the first embodiment, with the difference that the sensor 4 further comprises an RFID tag 7 connected to an RFID tag's antenna 8 and an RFID controller 9, connected to RFID controller's antenna 10, configured to maintain a communication with the RFID tag 7. In the presented embodiment, it is the electric conductive paths 5 that acts as the RFID antenna 8. In turn, the sensor 4 is configured such that upon at least partial breakage of the conductive paths 5 the communication between the RFID controller 9 and the RFID tag 7 is no longer possible thereby indicating the crack of the housing 2.

A sixth embodiment of the electric vehicle charging plug 1 comprising a housing 2 for connecting to an electric vehicle, a main housing 3 and a sensor 4 comprising electric conductive paths 5 arranged inside the surface of the housing 2 and the main housing 3, and a control unit 6.

The electric conductive paths 5 may have any of the forms as disclosed in the above-mentioned embodiments.

The housing 2 and the main housing 3 can be made of one or more of the materials as disclosed in the above-mentioned embodiments.

The sensor 4 further comprises an RFID system consisting of a RFID tag 7 connected to an RFID tag's antenna 8, and an RFID controller 9 connected to RFID controller's antenna 10. The RFID controller 9 is placed in the main housing 3 and the RFID tag 7 is placed in the housing 2 for connecting to an electric vehicle. In such a system, the RFID controller 9 is configured to measure resistance of the electric conductive paths 5 in the main housing 3 and the RFID tag 7 is configured to measure resistance of the electric conductive paths 5 in the housing 2. Further, the sensor 4 is configured such that upon at least partial breakage of at least one electric conductive path 5 in the housing 2 and/or in the main housing 3, their resistance measured by the RFID tag 7 and/or RFID controller 9 increases, thereby indicating the crack of the housing 2 and/or the main housing 3. The increase in the resistance value corresponds to the number of the broken electric conductive paths 5, which in turn allows the size of the cracks in the housing 2 and/or in the main housing 3 to be determined.

Furthermore, as in the abovementioned embodiments, the control unit 6 is configured to communicate with a charging device 11, especially in such a way that it triggers a control signal of the charging device 11 terminating or preventing the start of a charging process of the charging device 11 upon detecting the crack of the housing 2 and/or the main housing 3.

In summary, the occurrence of cracks in the housing 2 and/or the main housing 3 is associated with breakages of the electric conductive paths 5. The breakages of the electric conductive paths 5 cause an increase in resistance in the monitored circuit. The breakage of the conductive paths 5 inside the surface of the housing 2 is detected by the RFID tag 7 and the breakage of the conductive paths 5 inside the surface of the main housing 3 is detected by the RFID controller 9. As the RFID tag 7 is in communication with the RFID controller 9 and further the RFID controller 9 is in communication with the control unit 6, in case of breakages in either or both of the mentioned housings 2, 3 the control unit 6 receives an appropriate information about the crack(s) and it can send a control signal to the charging device 11 to terminate or to prevent the start of a charging process.

The application of the RFID system comprising its own RFID antennas as an additional part of the electric vehicle charging plug 1 ensures continuity of communication between the control unit 6 and the RFID system even if one or more of the electric conductive paths is broken. The maintenance of the continuity of communication makes it possible to distinguish damage of the controller 6 from electric conductive paths 5 breakage.

A seventh embodiment of the charging plug 1 as in the first embodiment, with the difference that the conductive paths 5 are light conductive paths and the control unit 6 is configured to measure intensity, modulation and/or frequency of the light beam in the light conductive paths.

An eight embodiment relates to a charger 12 comprising the charging plug 1 according to any of the embodiments from 1 to 7 and the charging device 11.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electric vehicle charging plug comprising:
   a housing configured to connect to an electric vehicle,
   a main housing,
   a sensor comprising at least one conductive path embedded in a wall or arranged on the surface of the housing and/or main housing, and
   a control unit,
   wherein the sensor is configured to:
      detect a crack of the housing and/or the main housing; and
      measure at least one characteristic of the at least one conductive path, wherein detecting the crack of the housing and/or the main housing is based on the at least one characteristic of the at least one conductive path changing upon at least partial breakage of the at least one conductive path, wherein the at least one conductive path is an electric conductive path, and wherein the control unit is configured to measure impedance, inductance and/or capacitance of the electric conductive path.

2. The electric vehicle charging plug according to claim 1, wherein the crack of the housing and/or the main housing is indicated by an increase of the resistance.

3. The electric vehicle charging plug according to claim 1, wherein the sensor further comprises an RFID tag connected to an RFID tag antenna, and an RFID controller connected to an RFID controller antenna, wherein the RFID controller is configured to maintain a communication with the RFID tag,
   wherein the at least one conductive path acts as the RFID tag antenna or as the RFID controller antenna, and
   wherein the sensor is configured such that upon the at least partial breakage of the at least one conductive path the communication between the RFID controller and the RFID tag is no longer possible thereby indicating the crack of the housing and/or the main housing.

4. An electric vehicle charging plug comprising:
   a housing configured to connect an electric vehicle,
   a main housing,
   a sensor comprising at least one conductive path embedded in a wall or arranged on the surface of the housing and/or main housing, and a RFID system consisting of a RFID tag connected to an RFID tag antenna and an RFID controller connected to a RFID controller antenna, and
   a control unit,
      wherein the sensor is configured to detect a crack of the housing and/or the main housing, and
      wherein the RFID system is configured to measure at least one characteristic of the least one conductive path, the at least one characteristic including resistance, impedance, inductance and/or capacitance,
      wherein the sensor is configured such that upon at least partial breakage of the least one conductive path the at least one characteristic of the at least one conductive path measured by the RFID system changes thereby indicating the crack of the housing and/or the main housing.

5. The electric vehicle charging plug according to claim 1, wherein the at least one conductive path is a light conductive path and the control unit is configured to measure intensity, modulation and/or frequency of a light beam in the light conductive path.

6. The electric vehicle charging plug according to claim 1, wherein the at least one conductive path is made of a metallic layer, conductive ink, conductive plastic or conductive elastomer.

7. The electric vehicle charging plug according to claim 1, wherein the least one conductive path is in a form of a conductive path on a foil.

8. The electric vehicle charging plug according to claim 1, wherein the at least one conductive path is arranged on a surface of the housing and/or the main housing utilizing 3D printing or utilizing Laser Direct Structuring technology.

9. The electric vehicle charging plug according to claim 1, wherein the at least one conductive path is made from at least one conductive thread.

10. The electric vehicle charging plug according to claim 1, wherein the control unit is configured to communicate with a charging device.

11. The electric vehicle charging plug according to claim 10, wherein the control unit is configured to trigger a control signal of the charging device terminating or preventing a start of a charging process of the charging device upon detecting the crack of the housing and/or the main housing.

12. The electric vehicle charging plug according to claim 1, wherein the at least one conductive path is arranged on an inside surface or an outside surface of the housing and/or the main housing.

* * * * *